US012301560B2

(12) United States Patent
Zhu

(10) Patent No.: US 12,301,560 B2
(45) Date of Patent: *May 13, 2025

(54) MULTI-FACTOR AUTHENTICATION USING SYMBOLS

(71) Applicant: Capital One Services, LLC, McLean, VA (US)

(72) Inventor: Vanck Zhu, New York, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/409,143

(22) Filed: Jan. 10, 2024

(65) Prior Publication Data

US 2024/0214374 A1    Jun. 27, 2024

Related U.S. Application Data

(63) Continuation of application No. 17/078,898, filed on Oct. 23, 2020, now Pat. No. 11,888,841.

(51) Int. Cl.
*H04L 9/40* (2022.01)
*G06F 3/0486* (2013.01)
*G06F 21/36* (2013.01)

(52) U.S. Cl.
CPC .......... *H04L 63/083* (2013.01); *G06F 3/0486* (2013.01); *G06F 21/36* (2013.01);
(Continued)

(58) Field of Classification Search
CPC ... H04L 63/083; H04L 63/0876; H04L 63/20;
H04L 2463/082; G06F 3/0486; G06F 21/36; G06F 21/34; H04W 12/068
(Continued)

(56) References Cited

U.S. PATENT DOCUMENTS 9,432,366 B2    8/2016 Apostolos et al.
9,613,201 B1    4/2017 Dotan et al.
(Continued)

FOREIGN PATENT DOCUMENTS

WO    2008105602 A1    9/2008
WO    2017030210 A1    2/2017

OTHER PUBLICATIONS

Enhancement of Educational Institutions Dynamic Websites by Adding Security and Accesibility, Fgee et al., Jul. 2010 (Year: 2010).*

(Continued)

*Primary Examiner* — Jahangir Kabir
(74) *Attorney, Agent, or Firm* — Harrity & Harrity, LLP

(57) ABSTRACT

In some implementations, a server device may receive, from a first device, a credential and a request to access a resource. The server device may transmit, to a second device associated with the credential, an image that includes a first symbol composed of a set of elements. The server device may receive, from the first device, information associated with a second symbol formed via user interaction with a user interface of the first device. The second symbol may be formed by dragging elements, presented via the user interface, to an area of the user interface in which the second symbol is to be formed, or drawing elements in the area of the user interface in which the second symbol is to be formed. The server device may grant or denying access to the resource based on the first symbol and the information associated with the second symbol.

20 Claims, 8 Drawing Sheets

(52) U.S. Cl.
CPC .......... *H04L 63/0876* (2013.01); *H04L 63/20* (2013.01); *H04L 2463/082* (2013.01)

(58) Field of Classification Search
USPC .......................................................... 726/6
See application file for complete search history.

(56) References Cited

U.S. PATENT DOCUMENTS

| | | | | |
|---|---|---|---|---|
| 9,686,426 | B2* | 6/2017 | Oguma | ................ G06F 3/1288 |
| 10,057,227 | B1 | 8/2018 | Hess et al. | |
| 10,218,506 | B1 | 2/2019 | Bhabbur et al. | |
| 2008/0098464 | A1 | 4/2008 | Mizrah et al. | |
| 2010/0185858 | A1* | 7/2010 | Nishimi | ............... H04N 1/4486 |
| | | | | 713/168 |
| 2013/0097697 | A1 | 4/2013 | Zhu et al. | |
| 2017/0154177 | A1 | 6/2017 | Tsou | |
| 2018/0144654 | A1 | 5/2018 | Olsen, Jr. | |
| 2022/0131850 | A1 | 4/2022 | Zhu | |

OTHER PUBLICATIONS

Chen X., et al., "Mobile Login Methods Help Chinese Users Avoid Password Roadblocks," Sep. 2, 2018, 13 pages.
"Emoji Passwords: Can't Crack This" 7 pages.
International Search Report and Written Opinion for Application No. PCT/US2021/056279, mailed on Feb. 8, 2022, 12 pages.
Kraus L., et al., "Implications of the Use of Emojis in Mobile Authentication," Symposium on Usable Privacy and Securih (SOUPS), Jun. 22-24, 2016, 2 pages, Denver, Colorado.
Kraus L., et al., "On the Use of Emojis in Mobile Authentication," 32nd IFIP International Conference on ICT Systems Security and Privacy Protection (SEC), May 2017, pp. 265-280, Rome, Italy.
Kutzner T., et al., "User Verification using Safe Handwritten Passwords on Smartphones," 2015 Eighth International Conference on Contemporary Computing (IC3), Aug. 2015, 6 pages.
Limer E., "Your Android Pattern Password is Super Easy to Guess," Popular Mechanics, Aug. 21, 2015, 4 pages.
Naone E., "Handwritten Passwords," IT Technology Review, Jun. 28, 2007, 3 pages.
Onarlioglu K., et al., "Overhaul: Input-Driven Access Control for Better Privacy on Traditional Operating Systems," Jun. 2016, pp. 443-454.
Rajpal et al., "Non-Intrusive Intellectual Gaming CAPTCHA for Optimal Web Security", International Conference on Advanced Computation and Telecommunication (ICACAT), IEEE, Dec. 28, 2018, pp. 1-7, XP033675360, [retrieved on Dec. 16, 2019].
Schaub F., "Why Emojis might be your Next Password," The Conversation, May 3, 2017, 3 pages. Retrieved from the Internet [URL:https://theconversation.com/why-emojis-might-be-your-next-password-76973].
Tolosana R., et al., "BioTouchPass: Handwritten Passwords for Touchscreen Biometrics," Journal of Latex Class Files, Mar. 2016, vol. 13, No. 9, 12 pages.
Yao B., et al., "Using Chinese Characters to Generate Text-Based Passwords for Information Security," Jul. 11, 2019, 59 pages.

* cited by examiner

MULTI-FACTOR AUTHENTICATION USING SYMBOLS

RELATED APPLICATION

This application is a continuation of U.S. patent application Ser. No. 17/078,898, filed Oct. 23, 2020, which is incorporated herein by reference in its entirety.

BACKGROUND

Multi-factor authentication (MFA) is an authentication technique in which a user of a computing device is granted access to a resource (e.g., a computing resource, a network resource, or an application) only after successfully proving two or more factors to an authentication service. The two or more factors may include knowledge (e.g., something only the user knows), possession (e.g., something only the user has), and/or inherence (e.g., something only the user is).

SUMMARY

In some implementations, a system for authenticating a user for access to a network resource using multi-factor authentication includes memory and one or more processors, communicatively coupled to the memory, configured to receive, from a client device, a login credential and a request to access the network resource; determine a user device identifier associated with the login credential; transmit an image or a link to the image to a user device associated with the user device identifier, wherein the image includes an authentication symbol composed of a set of elements; transmit, to the client device, user interface information to cause the client device to present a user interface, wherein the user interface information identifies a plurality of elements, including at least the set of elements, and enables elements, of the plurality of elements, to be selected via the user interface to form a symbol; receive input symbol information from the client device, wherein the input symbol information is based on an input symbol formed via user selection of multiple elements, of the plurality of elements, via the user interface; compare the input symbol information to authentication symbol information associated with the authentication symbol; and grant or deny access to the network resource based on comparing the input symbol information to the authentication symbol information.

In some implementations, a method for multi-factor authentication includes receiving, by a server device and from a first device, a credential and a request to access a resource; transmitting, by the server device and to a second device associated with the credential, an image, wherein the image includes a first symbol composed of a set of elements; receiving, by the server device and from the first device, information associated with a second symbol formed via user interaction with a user interface of the first device, wherein the second symbol is formed via at least one of: separately dragging multiple elements, presented via the user interface, to an area of the user interface in which the second symbol is to be formed, or drawing multiple elements in the area of the user interface in which the second symbol is to be formed; and granting or denying access to the resource based on the first symbol and the information associated with the second symbol.

In some implementations, a non-transitory computer-readable medium storing a set of instructions includes one or more instructions that, when executed by one or more processors of a client device, cause the client device to transmit, to a server device, a request to access a network resource; receive, from the server device and based on transmitting the request, user interface information that identifies a plurality of elements to be presented via a user interface of the client device; present, via the user interface, the plurality of elements and an area in which a symbol is to be formed via user selection of elements of the plurality of elements; present, in the area of the user interface, a symbol formed via user interaction with multiple elements of the plurality of elements, wherein the symbol is formed by overlapping or intersecting at least two elements of the multiple elements selected via the user interaction; and transmit, to the server device, information associated with the symbol; and receive, from the server device, a message indicating whether access to the network resource is granted or denied based on transmitting the information associated with the symbol.

DETAILED DESCRIPTION

Figure 1A:
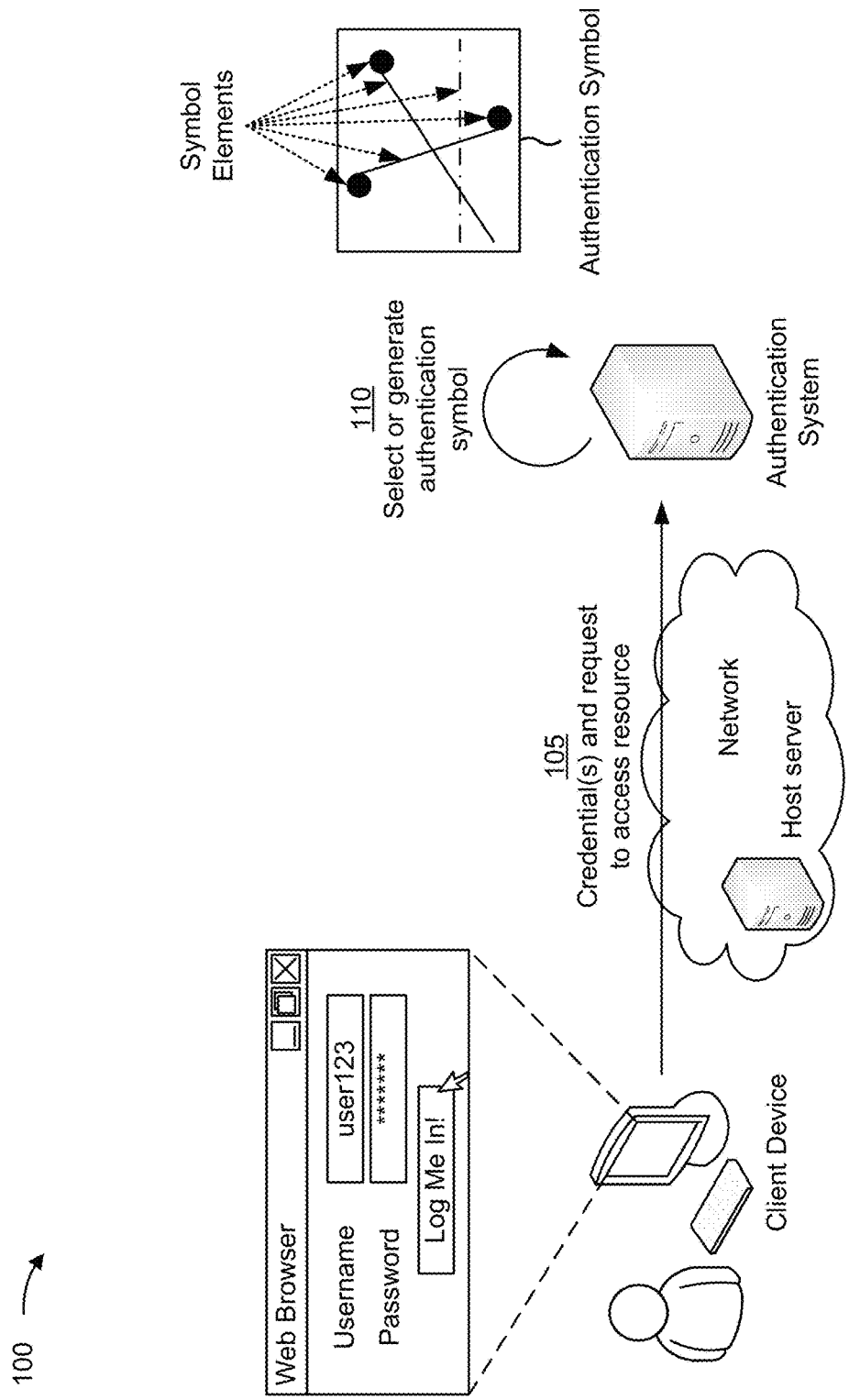
FIGS. 1A-1D are diagrams of an example implementation relating to multi-factor authentication using symbols.

The following detailed description of example implementations refers to the accompanying drawings. The same reference numbers in different drawings may identify the same or similar elements.

Short Message Service One-Time Password (SMS OTP) is a type of multi-factor authentication (MFA) used to verify a user's identity to determine whether to grant a computing device, associated with a user, access to a network resource. SMS OTP typically involves sending a numerical passcode, that is valid for only a short time, to a secondary contact point (e.g., a smartphone) that is known to be owned by the user. The user subsequently enters the numerical passcode into a prompt on the computing device on which the user initially requested access to the network resource. However, such numerical passcodes used for MFA are subject to "man-in-the-middle" attacks, in which a malicious person calls the user and manipulates the user to read and/or verbally communicate the numerical passcode over the phone.

Some implementations described herein enable MFA using a symbol that can be input on a computing device, but that is difficult for a user to describe over the phone. For example, in some implementations, the symbol does not include and is not composed of characters or icons that appear on a keyboard (e.g., a physical keyboard or a virtual keyboard), and thus cannot be easily read or described. This reduces the vulnerability of the MFA to man-in-the-middle attacks. However, it may be difficult to communicate such a symbol to a user via a user device (e.g., mobile device) and receive the symbol from a client device (e.g., via a web browser) because the symbol cannot be typed using a keyboard of the user device and/or the client device. Furthermore, it may be difficult to determine whether the symbol received from the client device matches the symbol sent to the user device. For example, as described in more detail elsewhere herein, the user may be prompted to recreate the symbol via a web browser by drawing the symbol using a cursor and/or dragging and dropping elements of the symbol into an area of the user interface. In these examples, the symbol created by the user may not exactly match the symbol transmitted to the user device.

Some implementations described herein enable an authentication system to transmit, to a user device, an image or an animation of an authentication symbol composed of a set of elements, and to provide, to a client device, a user interface (UI) (e.g., of a web browser) that allows the user to form an input symbol by combining elements. The authentication system may receive, from the client device, input symbol information based on the input symbol formed via user selection of elements in the UI, may compare the input symbol information to authentication symbol information associated with the authentication symbol, and may grant or deny access to a network resource based the comparison between the input symbol information and the authentication symbol information. As a result, a symbol that is difficult for a user to describe verbally may be provided to the user device, received from the client device, and used to provide MFA to determine whether to grant the client device access to a network resource. In this way, vulnerability of MFA to man-in-the middle attacks may be reduced, thereby enhancing security and reducing fraud.

FIGS. 1A-1D are diagrams of an example 100 associated with MFA using symbols. As shown in FIGS. 1A-1D, example 100 includes a client device, a user device, an authentication system, and a host server. These devices are described in more detail in connection with FIGS. 2 and 3.

As shown in FIG. 1A, and by reference number 105, the client device may transmit, to the authentication system via a network, a login credential (or login credentials) associated with a user and a request to access a network resource. The login credential may include a username and a password associated with the user. In some implementations, the user may enter the login credential (e.g., username and password) into a prompt displayed in a web browser executing on the client device. For example, the prompt to enter the login credential and request access to the network resource may be displayed in the web browser on a website delivered to the client device by the host server.

The client device may be a first computing device (e.g., a computer, a tablet computer, or a smart phone). The authentication server may be a server device that performs MFA to determine whether the client device is authorized to access the network resource. In some implementations, the network resource may include a computing resource (e.g., a server device, a cloud computing device, and/or a network device), a software resource (e.g., an application, a computer program, and/or a web site), a financial account (e.g., a credit card account, a checking account, or a savings account), an account associated with an intranet, and/or a resource that enables modification to an account (e.g., a user account or a financial account), among other examples. The authentication system may be associated with any entity, such as a financial institution (e.g., a bank, a retail bank, an investment bank, and/or a credit card company), an online retailer, or a gaming entity, and may store and/or manage user account data.

Although implementations are described herein in connection with authenticating a user to grant or deny access to a network resource, the techniques described herein may be used to authenticate a user to grant or deny access to a physical resource, such as a building, a room, a parking lot, or a secure area. In such examples, the credential and the request to access the resource (e.g., a physical resource) may be transmitted based on a user interaction with a security device (e.g., which may include a lock, a deadbolt, a turnstile, or the like), such as by inputting an access number to the security device (e.g., using a physical or virtual keypad), swiping an access card using the security device (e.g., via a magnetic stripe reader), or moving an access card within communicative proximity of the security device (e.g., for near-field communication).

The authentication system may receive the login credential transmitted from the client device via the network. The authentication system may then verify the received login credential based on a comparison with a stored login credential, and may determine a user device identifier associated with the login credential. The user device identifier may include, for example, a phone number associated with a user device of the user or other contact information that enables communication with the user device and/or the user, such as an email address associated with an email account of the user, an application identifier that identifies the user and/or the user device in connection with an authentication application that executes on the client device and/or the user device, or another type of identifier. Although some implementations described herein use a phone number to transmit an authentication symbol to a user device, some implementations may use an email address or an application identifier to transmit the authentication symbol to an email account or a security application account associated with the user. In such examples, the user may access the authentication symbol using the client device or using a user device that is different from the client device. In other words, the client device and the user device are the same device in some implementations.

The authentication system may store or have access to user information including the login credential (e.g., username and password) and the user device identifier associated with the login credential, which may be stored in one or more data structures. In some implementations, a hashed password data structure may store the username, a hashed value derived from the password (e.g., using one or more hashing algorithms), and the user device identifier associated with the username. In this case, the authentication system may verify that the received username matches a username stored in the data structure, and may verify the password by deriving a hashed value from the received password and comparing the derived hashed value derived to the stored hash value associated with the username in the data structure. The authentication system may then retrieve the stored user device identifier associated with the username from the data structure. The user device identified by the user device identifier may be a second computing device associated with the user, which may be different than the client device (or which may be the same as the client device in some implementations, as described above). In some implementations, the user device may be a mobile device (e.g., a smart phone or a tablet computer).

As further shown in FIG. 1A, and by reference number 110, the authentication system may select or generate an authentication symbol for MFA. The authentication symbol may be composed of multiple elements (shown as "symbol elements"). An element may include, for example, a geometric object, such as a line, a curve, a polygon, or a shape. Additionally, or alternatively, an element may include an icon, and/or a picture. The element may have a particular visual attribute, such as a size, orientation, color, shading, pattern, design, and/or position (e.g., a position relative to other elements of the symbol). In some implementations, the authentication symbol is a non-alphanumeric symbol formed using a combination of multiple elements. In some implementations, the authentication symbol may be a symbol that is particular to the MFA process and is not associated with another meaning. That is, the authentication symbol may be a symbol that is "made up" or generated for the MFA process and not used for another purpose. For example, in some implementations, the authentication symbol is not a part of an alphabet or a number system.

In some implementations, the authentication symbol may be composed of a single element rather than multiple elements. For example, the single element may include a complex element that includes one or more geometric objects, one or more icons, and/or one or more pictures having various visual attributes.

In some implementations, the authentication system may select the authentication symbol from a library of authentication symbols formed using different combinations of elements. For example, the authentication system may select the authentication symbol (e.g., randomly or pseudo-randomly) from a data structure that stores the library of authentication symbols. Alternatively, the authentication system may generate the authentication symbol from multiple elements. For example, a data structure may store a library of elements, and the authentication system may select (e.g., randomly or pseudo-randomly) a quantity of elements and generate the authentication symbol from the selected elements (e.g., by combining the elements to form the authentication symbol). In this case, the authentication system may generate the authentication symbol using at least a threshold quantity of elements to increase complexity of the authentication symbol and to increase a difficulty of verbally describing the authentication symbol. The elements stored in the library of elements may have particular visual attributes, as described above. In some implementations, the authentication system may select and/or adjust one or more visual attributes of the selected elements for the authentication symbol. In some implementations, the authentication system may track a sequence (e.g., an order) in which the elements were added to generate the authentication symbol, and may store authentication symbol information that indicates the sequence.

In some implementations, the authentication system may generate the authentication symbol using at least two similar elements. For example, the authentication system may generate the authentication symbol to include two or more elements that are similar geometric objects and/or that have similar visual attributes. In this case, the data structure that stores the library of elements may store similarity information that indicates associations between elements that share a degree of similarity. The authentication system may select a first element to be included in the authentication symbol. The authentication system may then identify a second element to be included in the authentication symbol based on the first element and using the similarity information stored in the data structure. For example, the data structure may indicate a set of (e.g., one or more) elements that share a degree of similarity with the first element, and the authentication system may select the second element from the set of elements. In this way, the authentication system may make a verbal explanation of the authentication symbol and/or the elements in the authentication symbol more difficult, thereby reducing the vulnerability of MFA to a man-in-the-middle attack.

Figure 1B:
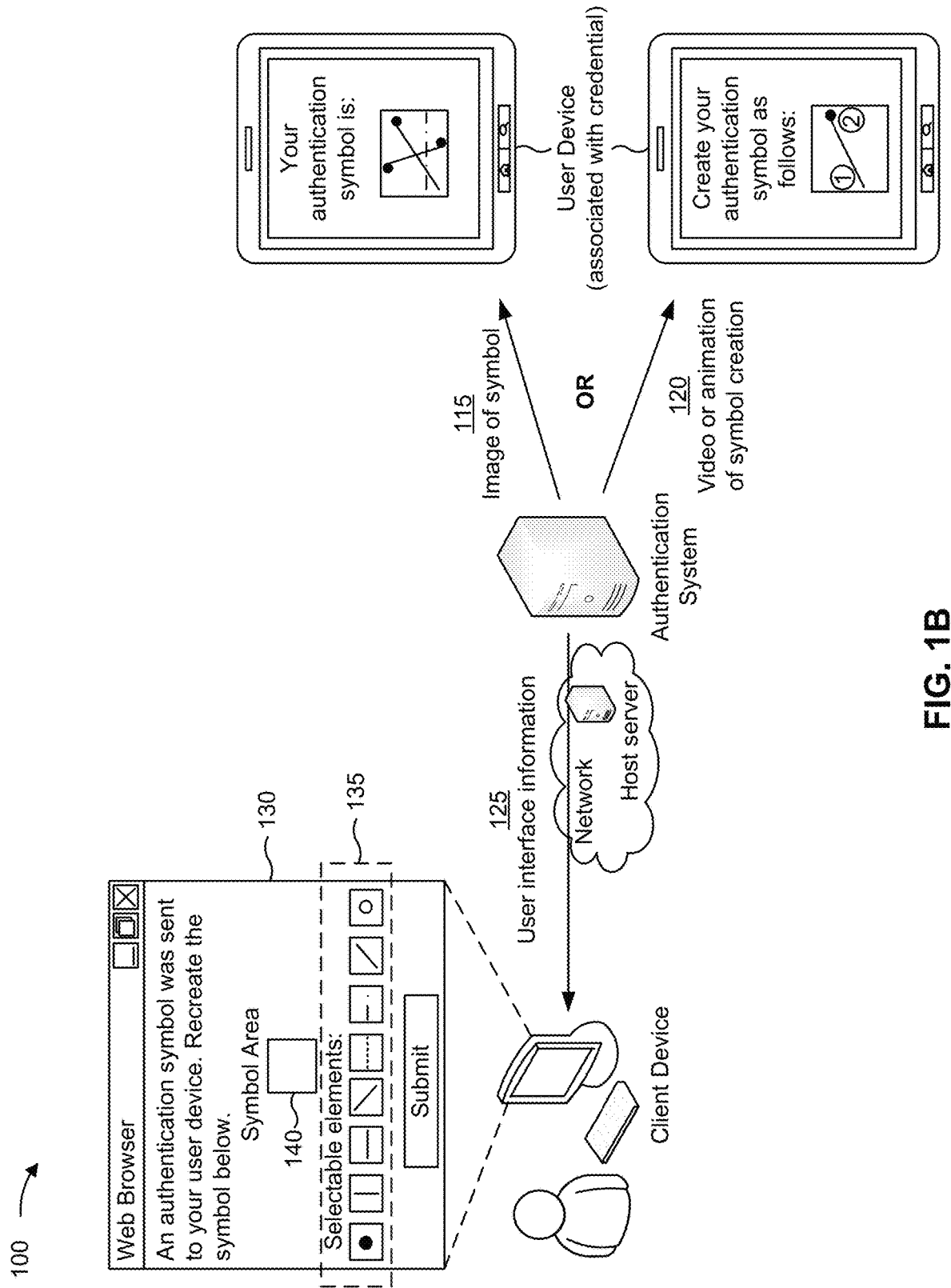

As shown in FIG. 1B, and by reference number 115, in some implementations, the authentication system may transmit, to the user device associated with the login credential, an image of the authentication symbol. For example, the image including the authentication symbol composed of the multiple elements may be in a Joint Photographic Experts Group (JPEG) file, a Tagged Image File Format (TIFF) file, a Graphics Interchange Form (GIF) file, a Portable Network Graphics (PNG) file, a Bitmap (BMP) file, or in any other image file format. In some implementations, the authentication system may transmit the image to the user device in a text message (e.g., a multimedia messaging service (MMS) message), an email message, or an instant messaging message. Additionally, or alternatively, the authentication system may transmit, to the user device, a link to the image including the authentication symbol. For example, the authentication system may transmit, to the user device, a link to a uniform resource locator (URL) of a webpage at which the image can be viewed. In this case, in addition to the other message types indicated above, the authentication system may transmit the link to the image to the user device in a short messaging service (SMS) message.

As further shown in FIG. 1B, and by reference number 120, in some implementations, the authentication system may transmit, to the user device associated with the login credential, a video or an animation that shows a sequence for creating the authentication symbol. The video or animation may include a series of images (e.g., frames) that are presented in a sequence to show the formation of the authentication symbol using the multiple elements. For example, the series of images may show the sequential addition of individual elements to generate the authentication symbol. In this case, the authentication may be based on the user reproducing the correct sequence of generating the authentication symbol from the multiple elements. In some implementations, the sequence of creating the authentication symbol may include adding an element to the authentication symbol and then removing that element from the authentication symbol. For example, an element may be added and immediately removed or an element may be added and later removed after one or more other elements have been added. In some implementations, the sequence may show an element being drawn at a particular speed. In this case, the authentication may be based on a speed at which the element is drawn by the user, as described in more detail below. The authentication system may transmit the video or animation (e.g., the series of images) and/or a link to the video or animation to the user device in a message, as described above.

As further shown in FIG. 1B, and by reference number 125, the authentication system may transmit, to the client device via the network, user interface (UI) information. As shown by reference number 130, the UI information may cause the client device to present, via a display of the client device (e.g., in a web browser), a UI that enables the user to recreate the authentication symbol transmitted to the user device by forming a symbol from a set of (e.g., one or more) elements. For example, the UI information may be delivered to the client device from the authentication system via the host server, and the UI may be displayed on the web browser executing on the client device.

As shown by reference number 135, the UI may include a set of selectable elements. Additionally, or alternatively, as shown by reference number 140, the UI may include a symbol area. The user may use an input component (e.g., a mouse or a touch screen) of the client device to select elements from the set of selectable elements and/or to place the selected elements in the symbol area to form an input symbol (e.g., to match or approximately match the authentication symbol transmitted to the user device). The UI may enable the user to select multiple elements from the set of selectable elements and to overlap and/or intersect the multiple elements in the symbol area to form the input symbol.

In some implementations, the authentication system may indicate the set of selectable elements, to be presented on the UI, in the UI information transmitted to the client device. The authentication system may determine the set of selectable elements based on the set of elements from which the authentication symbol is composed. In some implementations, the set of selectable elements identified in the UI information may include the set of elements from which the authentication symbol is composed and one or more other elements that are not components of the authentication symbol. For example, the authentication system may determine the set of selectable elements by identifying, in a library of elements, the set of elements from which the authentication symbol is composed, and selecting, from the library of elements, the one or more other elements that are not components of the authentication symbol.

In some implementations, the authentication system may randomly select the one or more elements that are not components of the authentication symbol from the library of elements. In some implementations, the authentication system may identify the one or more elements that are not components of the authentication symbol based on the set of elements from which the authentication symbol is composed. For example, the authentication system may identify, in the library of elements, one or more elements not in the authentication symbol that are similar to one or more of the elements in the set of elements from which the authentication symbol is composed using similarity information, in a similar manner as described above.

In some implementations, one or more of the selectable elements in the set of selectable elements may be moving or animated elements. For example, an animated element may show a line or shape being drawn at a particular speed. In this case, the set of selectable elements may include one or more elements of the authentication symbol animated as being drawn at the same speed as in the video or animation transmitted to the user device. The set of selectable elements may also include one or more elements of the authentication symbol animated as being drawn at a different speed from the speed at which the one or more elements are drawn in the video or animation transmitted to the user device. The user may select the animated selectable elements to recreate the formation of the authentication symbol including the speed at which one or more of the elements are drawn.

Figure 1C:
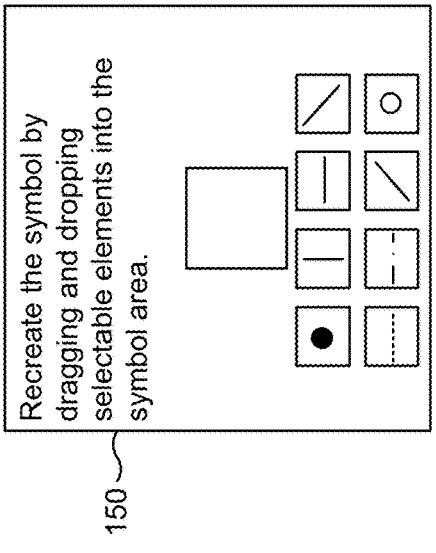
Figure 1C:
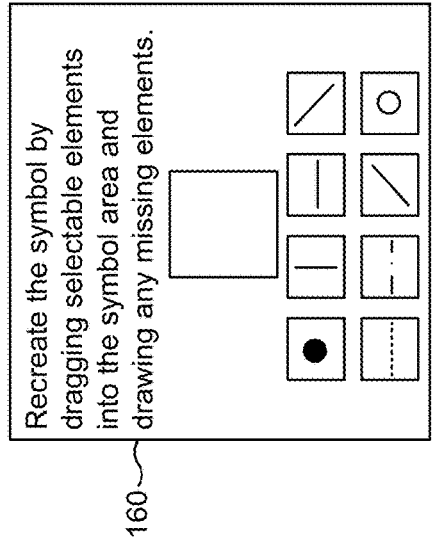
Figure 1C:
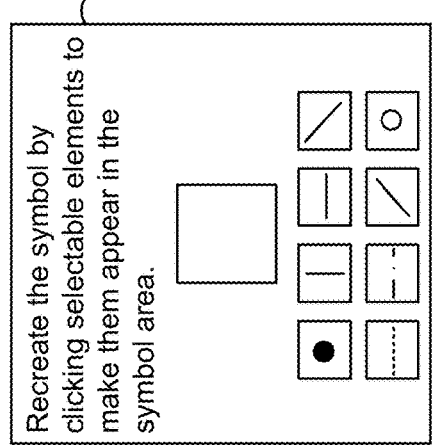
Figure 1C:
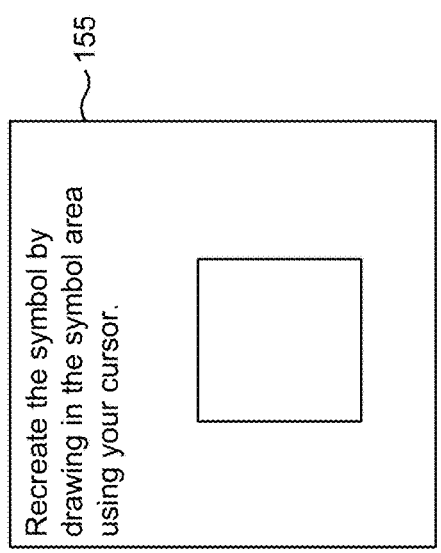

As shown in FIG. 1C, various implementations of the UI may be used to enable the user of the client device to recreate the authentication symbol transmitted to the user device. As shown in FIG. 1C, and by reference number 145, in some implementations, the UI may instruct the user to recreate the authentication symbol by clicking (or otherwise selecting) representations of the selectable elements. In this example, user interaction with a selectable element causes that element to appear in the symbol area. In this case, each of the selectable elements may be associated with a corresponding position in the symbol area. When the user selects a selectable element, the UI places the selected element at the corresponding position in the symbol area. In this case, the user may recreate the authentication symbol by selecting the correct elements from the set of selectable elements in the UI, but the user does not have to place the elements in the correct positions in the symbol area. In some implementations, the UI may also instruct the user to select the elements from the set of selectable elements in the correct sequence (e.g., in the sequence shown in a video or animation transmitted to the user device).

As shown by reference number 150, in some implementations, the UI may instruct the user to recreate the authentication symbol by dragging and dropping the selectable elements into the symbol area (e.g., using a mouse, a finger, or a stylus). In this case, the selectable elements may be moveable within the symbol area. The user may recreate the authentication symbol using a drag and drop input mechanism that enables the user to drag and drop elements separately to the symbol area, such as by separately selecting the correct elements from the set of selectable elements and/or separately dragging and dropping each selected element to the correct positions in the symbol area. In some implementations, the UI may also instruct the user to drag and drop the elements from the set of selectable elements at the correct positions in the symbol area and in the correct sequence.

As shown by reference number 155, in some implementations, the UI may instruct the user to recreate the authentication symbol by drawing the symbol in the symbol area. In this case, the UI may not include the set of selectable elements. The user may recreate the authentication symbol using a drawing input mechanism that enables the user to draw elements in the symbol area, such as by using an input component (e.g., a mouse or touch screen) of the client device to draw a symbol in the symbol area. In some implementations, the UI may also instruct the user to recreate the authentication symbol by drawing the elements of the authentication symbol in the correct sequence. Additionally, or alternatively, the UI may instruct the user to draw one or more of the elements of the authentication symbol at a same speed or a similar speed to a speed at which the one or more elements are drawn in the video or animation transmitted to the user device.

As shown by reference number 160, in some implementations, the UI may instruct the user to recreate the symbol by dragging the selectable elements into the symbol area and drawing any missing elements. In this case, the set of selectable elements may not include all of the elements from which the authentication symbol is composed. The user may recreate the elements in the authentication symbol for which selectable elements are provided in the UI by dragging the selectable elements to the correct positions in the symbol area in a similar manner as described in connection with reference number 150 and/or by selecting one or more selectable elements as described in connection with reference number 145. The user may recreate elements in the authentication symbol that are not included in the set of selectable elements by drawing those elements in the symbol area in a similar manner as described in connection with reference number 155. In some implementations, the UI may also instruct the user to drag the selectable elements and draw the missing elements in the correct sequence. Additionally, or alternatively, the UI may instruct the user to draw one or more of the missing elements at a same speed or a similar speed to a speed at which those elements are drawn in the video or animation transmitted to the user device.

Figure 1D:
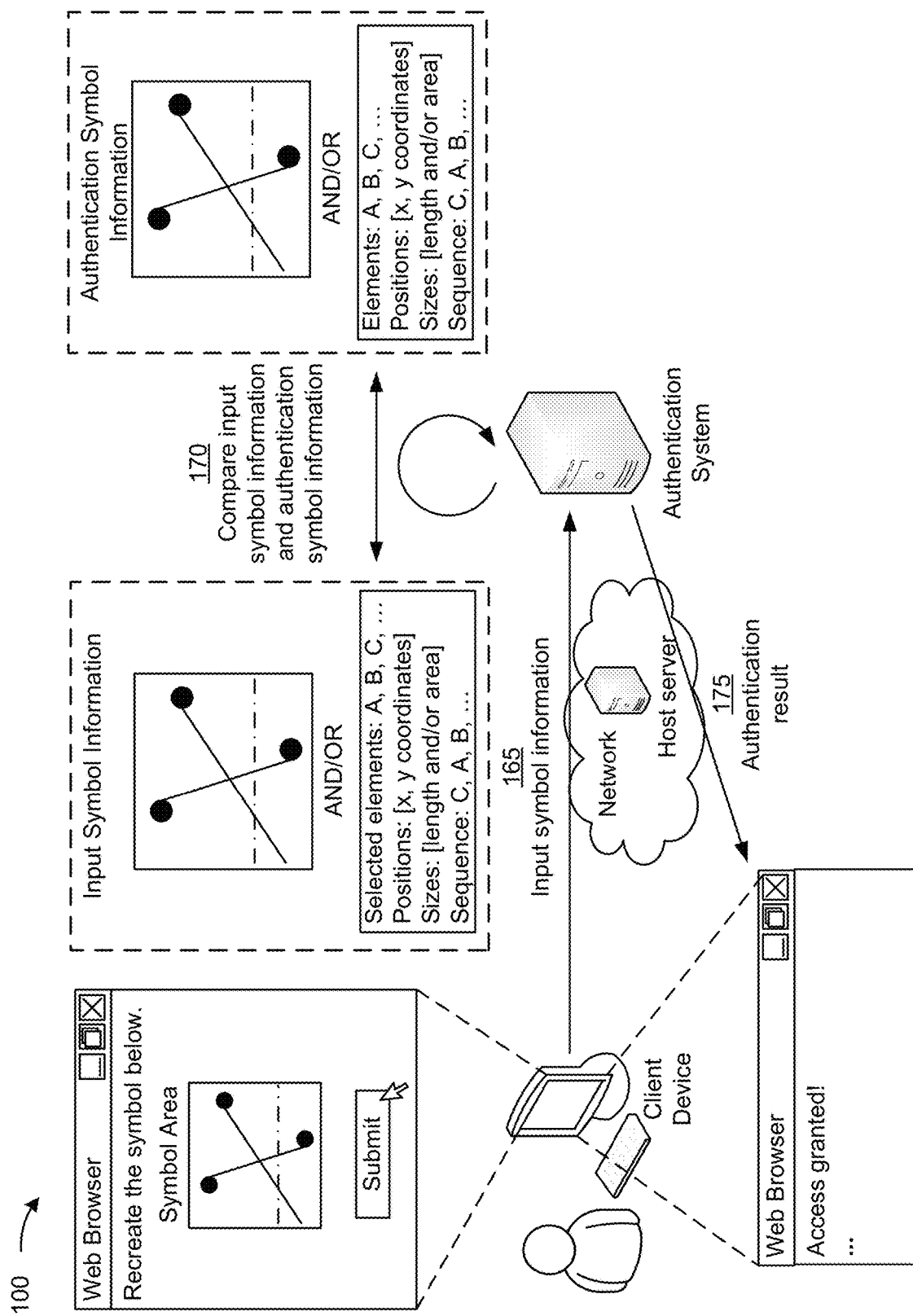

As shown in FIG. 1D, and by reference number 165, the client device may transmit, to the authentication system via the network, input symbol information based on an input symbol generated via user interaction with the UI. The input symbol is the symbol generated as a result of the user recreating or attempting to recreate the authentication symbol using the UI. The UI may include an input mechanism to cause submission of the input symbol. When the input mechanism is selected by the user, the client device may transmit input symbol information, based on the input symbol, to the authentication system. The authentication system may receive the input symbol information transmitted from the client device.

In some implementations, the input symbol information may include information that identifies the elements that were selected via the UI to form the input symbol (shown as elements A, B, C, . . . ). The input symbol information may also include position information that indicates positions of the elements within the symbol area of the UI (shown as x, y coordinates representing a horizontal position and a vertical position of an element within the symbol area). Additionally, or alternatively, the input symbol information may indicate a size of an element, such as a length of a line and/or an area of a shape (e.g., using one or more parameters from which an area can be calculated, such as a length, a height, a radius, and/or a diameter). Additionally, or alternatively, the input symbol information may indicate a sequence in which the elements were selected and/or drawn to create the input symbol (shown as a sequence of elements C, A, B, . . . , with C being input first, A being input second, B being input third, and so on). In some implementations, the input symbol information may include information that indicates a speed at which one or more of the elements were drawn (e.g., a length of time between starting and finishing a drawing of the element or a rate of movement of a cursor, finger, or stylus while drawing the element).

Additionally, or alternatively, the input symbol information may include an image of the input symbol generated using the UI. For example, the image of the input symbol may be included in a JPEG file, TIFF file, GIF file, PNG file, BMP file, or any other image format. In some implementations, the image of the input symbol may be transmitted to the authentication system instead of or in addition to the other input symbol information described above. In some implementations, the input symbol information may include a series of images (e.g., a video or animation) showing the creation of the input symbol.

As shown by reference number 170, the authentication system may compare the input symbol information, received from the client device, and authentication symbol information associated with the authentication symbol. The authentication symbol information may be stored by the authentication system after generating the authentication symbol, as described above in connection with FIG. 1A. The authentication symbol information includes the same type(s) of information as the input symbol information, as described above. The authentication system may determine whether to grant or deny the client device access to the network resource based on the comparison of the input symbol information and the authentication symbol information.

For example, the authentication system may compare the selected elements in the input symbol with the set of elements in the authentication symbol to determine whether the selected elements in the input symbol match the set of elements from which the authentication symbol is composed. Additionally, or alternatively, the authentication system may compare the positions of the selected elements in the input symbol with the positions of the elements in the authentication symbol. For example, the authentication system may determine whether error measurements between the positions of the elements in the authentication symbol and the respective positions of the corresponding elements in the input symbol satisfy a threshold (e.g., are less than the threshold or less than or equal to the threshold) and/or satisfy a matching condition. For example, if a first point of a geometric shape (e.g., one end of a line, a corner of a shape, a center of a shape, or the like) included in the input element is within a threshold distance of a corresponding first point of a corresponding element of the authentication symbol, and if a second point of the geometric shape (e.g., another end of the line, another corner of the shape, a point along a boundary of the shape, or the like) included in the input element is within a threshold distance of a corresponding second point of a corresponding element of the authentication symbol, then the authentication system may determine that an error measurement for that input element satisfies a threshold or a matching condition with respect to position.

Additionally, or alternatively, the authentication system may compare the sizes of the selected elements in the input symbol with the sizes of the elements in the authentication symbol. For example, the authentication system may determine whether error measurements between the sizes of the elements in the authentication symbol and the respective sizes of the corresponding elements in the input symbol satisfy a threshold and/or satisfy a matching condition. For example, if a size of a geometric object (e.g., a length of a line, an area of a shape, or the like) included in the input element is within a threshold of a size of a corresponding geometric object of a corresponding element of the authentication symbol, then the authentication system may determine that an error measurement for that input element satisfies a threshold or a matching condition with respect to size.

Additionally, or alternatively, the authentication system may compare the sequence in which the elements were selected to form the input symbol and the sequence of elements used to create the authentication symbol (e.g., the sequence shown in the video or animation transmitted to the user device) to determine whether the sequence of elements for the input symbol matches the sequence of elements for the authentication symbol. In some implementations, when an element in the authentication symbol is associated with a drawing speed, the authentication system may compare the drawing speed associated the element in the authentication symbol with a drawing speed associated with the corresponding element in the input symbol. For example, the authentication system may determine whether a difference between the drawing speed associated with the element in the authentication symbol (e.g., a length of time to draw the element, a rate at which the element is drawn, or the like) and the drawing speed of the corresponding element in the input symbol satisfies a threshold or matching condition.

In some implementations, the authentication system may compare the image of the input symbol and the image of the authentication symbol. The authentication system may calculate a similarity score between the image of the input symbol and the image of the authentication symbol and determine whether the similarity score satisfies a similarity threshold. For example, the similarity score may be a correlation coefficient, a cross-correlation score, or another image processing based similarity score. In some implementations, the similarity score may be based on an error measurement, such as a sum squared difference (SSD), mean squared difference (MSD), mean absolute difference (MAD), or another image processing based error measurement, and the authentication system may determine whether the error measurement satisfies an error threshold (e.g., is less than the error threshold or less than or equal to the error threshold).

As shown by reference number 175, the authentication system may transmit an authentication result to the client device based on the comparison. For example, the authentication system may determine, based on the comparison of the input symbol information and the authentication symbol information, whether to grant or deny the client device access to the network resource. The authentication system may transmit, to the client device via the network, a message indicating whether access to the network resource is granted or denied. For example, the message indicating whether access to the network resource is granted or denied may be delivered from the authentication system to the client device via the host server and presented in the web browser executing on the client device. If access is granted, then the authentication system and/or the host server may provide the requested network resource (e.g., a web page) the client device for presentation via the web browser. If access is denied, then the authentication system and/or the host server may prevent the client device from accessing the requested network resource, and/or may provide a web page indicating that such access has been denied.

Using the techniques described herein, a symbol that is difficult for a user to describe verbally may be provided to the user device, received from the client device, and used to provide MFA to determine whether to grant the client device access to a network resource. In this way, vulnerability of MFA to man-in-the middle attacks may be reduced, and security may be enhanced.

As indicated above, FIGS. 1A-1D are provided as an example. Other examples may differ from what is described with regard to FIGS. 1A-1D.

Figure 2:
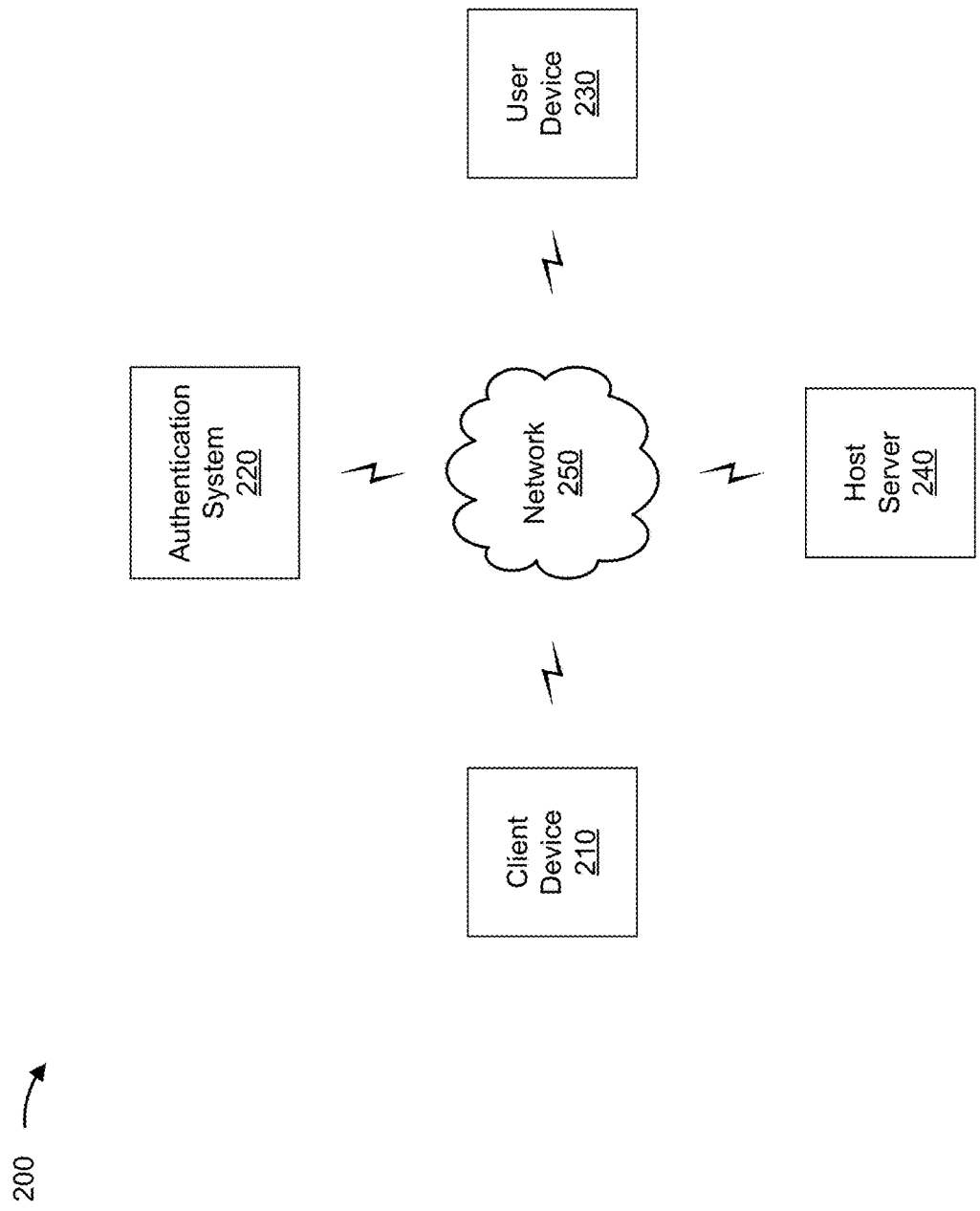
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, an authentication system 220, a user device 230, a host server 240, and a network 250. Devices of environment 200 may interconnect via wired connections, wireless connections, or a combination of wired and wireless connections.

The client device 210 includes one or more devices capable of receiving, generating, storing, processing, and/or providing information associated with MFA using symbols, as described elsewhere herein. The client device 210 may include a communication device and/or a computing device. For example, the client device 210 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The authentication system 220 includes one or more devices capable of receiving, generating, storing, processing, providing, and/or routing information associated with MFA using symbols, as described elsewhere herein. The authentication system 220 may include a communication device and/or a computing device. In some implementations, the authentication system 220 includes a server device. For example, the authentication system 220 may include a server, such as an application server, a client server, a web server, a database server, a host server, a proxy server, a virtual server (e.g., executing on computing hardware), or a server in a cloud computing system. In some implementations, the authentication system 220 includes computing hardware used in a cloud computing environment.

The user device 230 includes one or more devices capable of receiving, generating, storing, processing, and/or providing information associated with MFA using symbols, as described elsewhere herein. The user device 230 may include a communication device and/or a computing device. For example, the user device 230 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. In some implementations, the user device 230 and the client device 210 are the same device. In some implementations, the user device 230 and the client device 210 are different devices.

The host server 240 includes one or more devices capable of receiving, generating, storing, processing, providing, and/or routing information associated with MFA using symbols, as described elsewhere herein. The host server 240 may include a communication device and/or a computing device, such as a server device. For example, the host server 240 may include a server, such as an application server, a web server, a proxy server, a virtual server (e.g., executing on computing hardware), or a server in a cloud computing system. In some implementations, the host server 240 includes computing hardware used in a cloud computing environment. In some implementations, the authentication system 220 is implemented on and integrated with the host server 240 (e.g., to grant or deny access to network resources hosted or served by the host server 240).

The network 250 includes one or more wired and/or wireless networks. For example, the network 250 may include a cellular network, a public land mobile network, a local area network, a wide area network, a metropolitan area network, a telephone network, a private network, the Internet, and/or a combination of these or other types of networks. The network 250 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
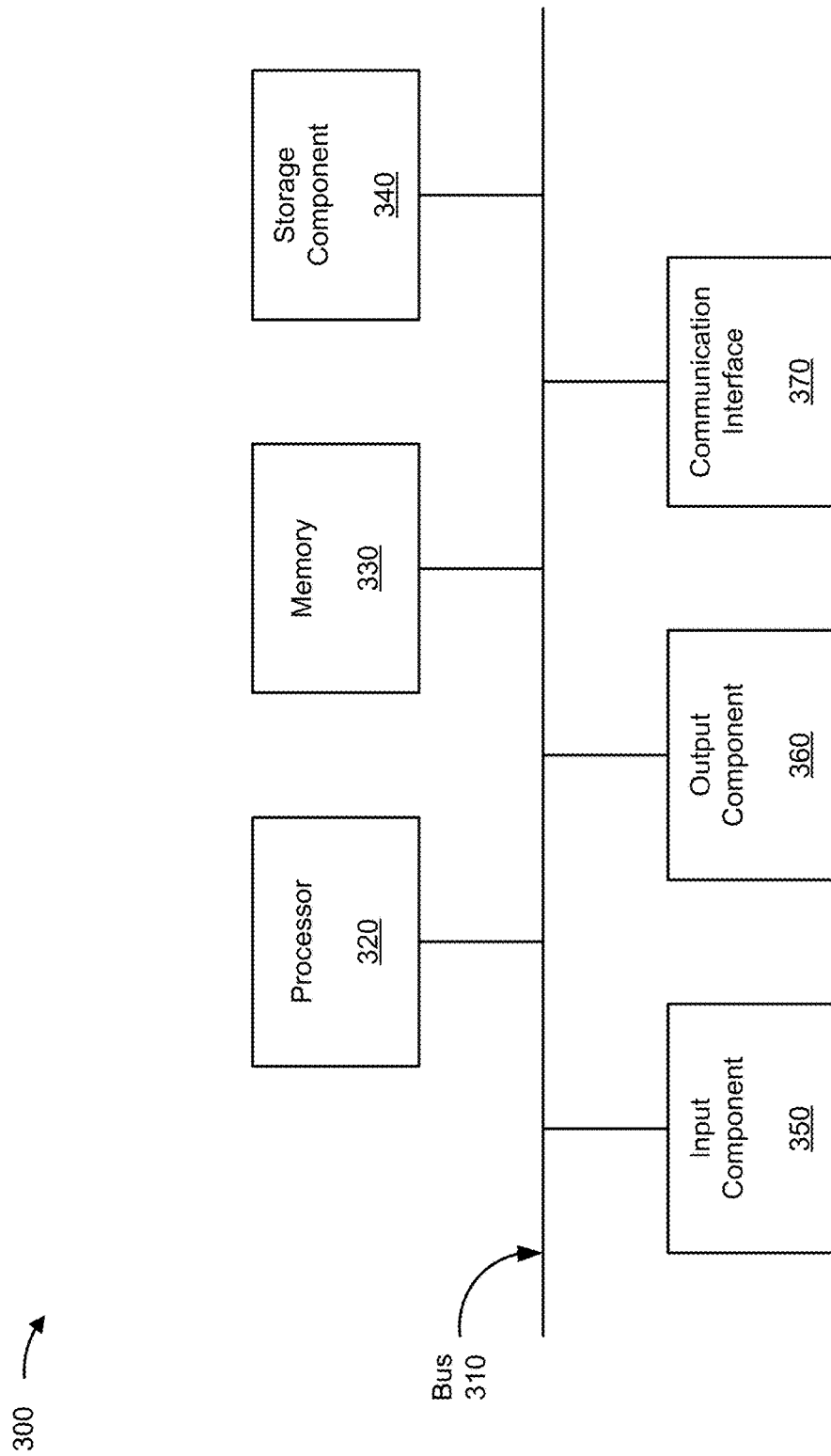
FIG. 3 is a diagram of example components of one or more devices of FIG. 2.

FIG. 3 is a diagram of example components of a device 300, which may correspond to the client device 210, the authentication system 220, the user device 230, and/or the host server 240. In some implementations, the client device 210, the authentication system 220, the user device 230, and/or the host server 240 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
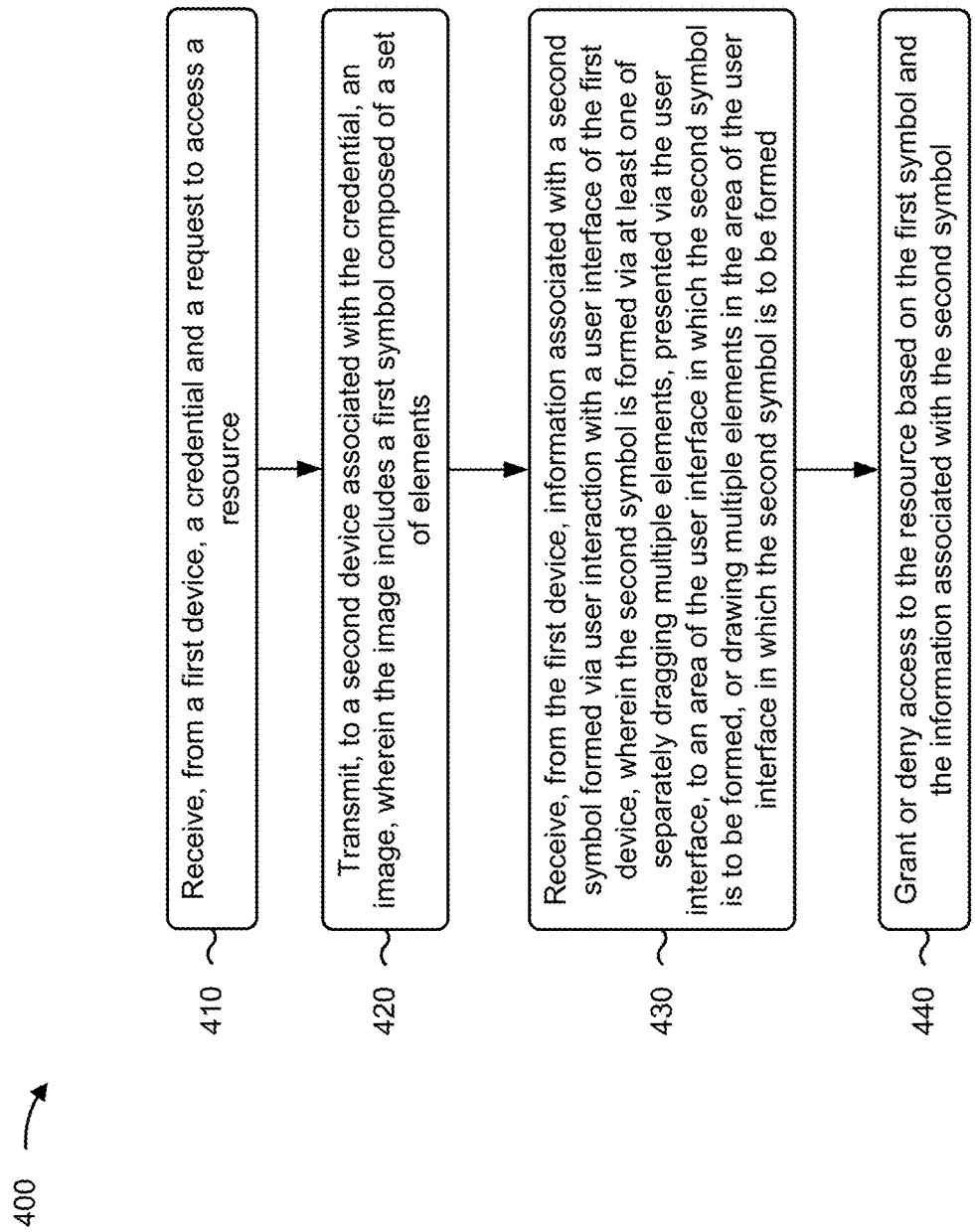
FIGS. 4 and 5 are flowcharts of example processes relating to multi-factor authentication using symbols.

FIG. 4 is a flowchart of an example process 400 associated with MFA using symbols. In some implementations, one or more process blocks of FIG. 4 may be performed by the authentication system 220, which may include a server device. In some implementations, one or more process blocks of FIG. 4 may be performed by another device or a group of devices separate from or including the authentication system 220, such as the host server 240. Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving, from a first device, a credential and a request to access a resource (block 410). As further shown in FIG. 4, process 400 may include transmitting, to a second device associated with the credential, an image, wherein the image includes a first symbol composed of a set of elements (block 420). As further shown in FIG. 4, process 400 may include receiving, from the first device, information associated with a second symbol formed via user interaction with a user interface of the first device (block 430). As shown, in some implementations, the second symbol is formed via at least one of separately dragging multiple elements, presented via the user interface, to an area of the user interface in which the second symbol is to be formed, or drawing multiple elements in the area of the user interface in which the second symbol is to be formed. As further shown in FIG. 4, process 400 may include granting or denying access to the resource based on the first symbol and the information associated with the second symbol (block 440).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
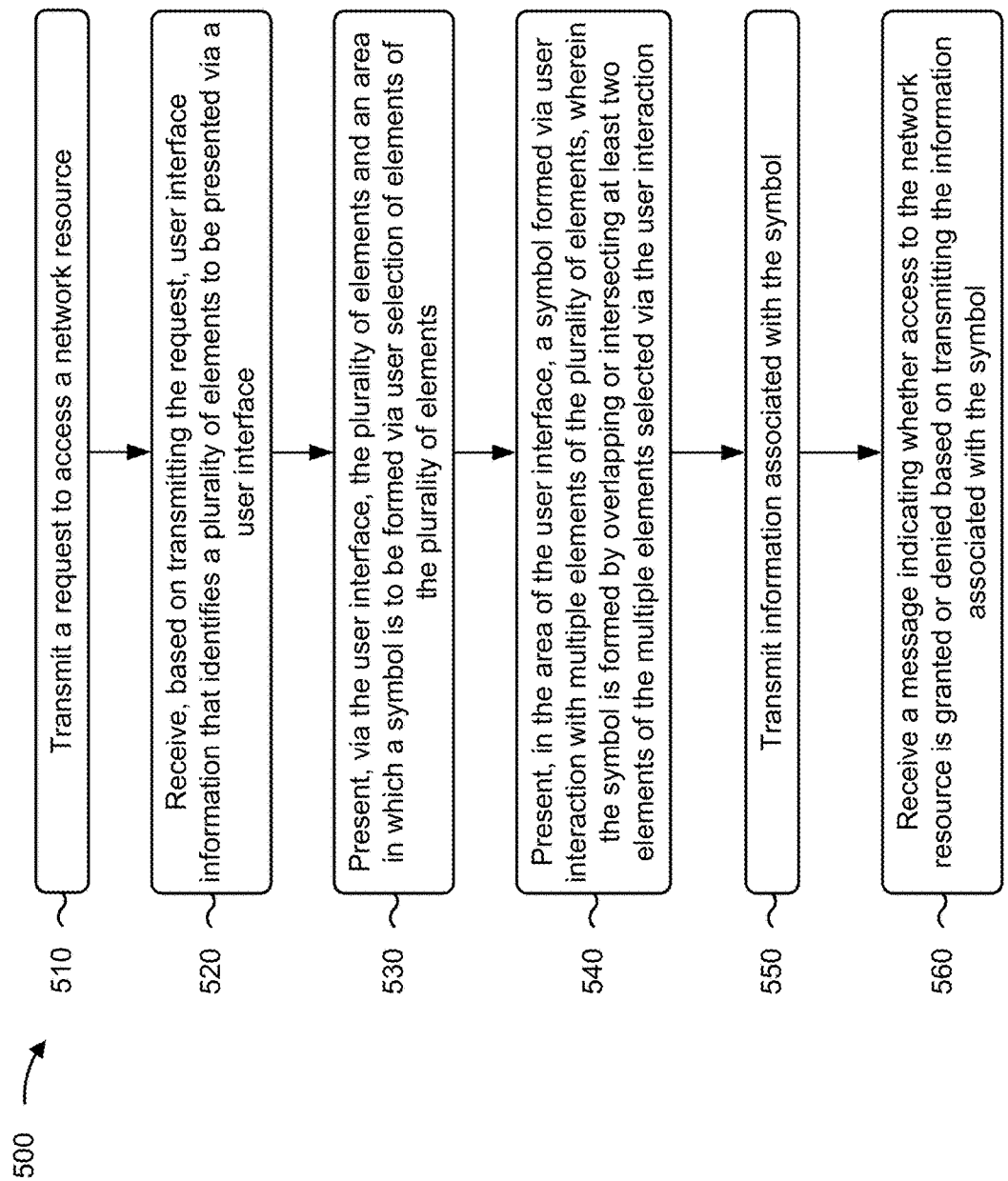

FIG. 5 is a flowchart of an example process 500 associated with MFA using symbols. In some implementations, one or more process blocks of FIG. 5 may be performed by the client device 210. In some implementations, one or more process blocks of FIG. 5 may be performed by another device or a group of devices separate from or including the client device 210, such as the user device 230. Additionally, or alternatively, one or more process blocks of FIG. 5 may be performed by one or more components of device 300, such as processor 320, memory 330, storage component 340, input component 350, output component 360, and/or communication component 370.

As shown in FIG. 5, process 500 may include transmitting a request to access a network resource (block 510). As further shown in FIG. 5, process 500 may include receiving, based on transmitting the request, user interface information that identifies a plurality of elements to be presented via a user interface (block 520). As further shown in FIG. 5, process 500 may include presenting, via the user interface, the plurality of elements and an area in which a symbol is to be formed via user selection of elements of the plurality of elements (block 530). As further shown in FIG. 5, process 500 may include presenting, in the area of the user interface, a symbol formed via user interaction with multiple elements of the plurality of elements (block 540). As shown, in some implementations, the symbol is formed by overlapping or intersecting at least two elements of the multiple elements selected via the user interaction. As further shown in FIG. 5, process 500 may include transmitting information associated with the symbol (block 550). As further shown in FIG. 5, process 500 may include receiving a message indicating whether access to the network resource is granted or denied based on transmitting the information associated with the symbol (block 560).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, etc., depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for authenticating a user for access to a network resource using multi-factor authentication, the system comprising:
    memory; and
    one or more processors, coupled to the memory, configured to:
        transmit, to a user device associated with a request to access the network resource, an image, or a link to the image, wherein the image is composed of a set of visual elements that each have a particular visual attribute;
        transmit, to a client device, information to cause the client device to present an interface indicating instructions to recreate the image by inputting one or more visual elements to form an input image of an authentication symbol with reference to the image presented to the user device, the input image being formed via input of a set of one or more visual elements via the interface; and
        grant or deny access to the network resource based on comparing information indicative of the input image to authentication symbol information, wherein the authentication symbol information is associated with the authentication symbol.

2. The system of claim 1, wherein the input image is formed using a drag and drop input mechanism.

3. The system of claim 1, wherein the one or more processors are further configured to:
    receive, from the client device, a login credential and the request to access the network resource, wherein transmitting the image, or the link to the image, is based on receiving the login credential and the request to access the network resource.

4. The system of claim 1, wherein the one or more processors are further configured to:
    receive position information that identifies respective positions of the set of one or more visual elements within the interface,
    wherein the one or more processors, when granting or denying access to the network resource, are configured to:
        determine whether the set of one or more visual elements match the set of visual elements from which the image is composed; and
        determine, based on the position information, whether the respective positions of the set of one or more visual elements satisfy a threshold with respect to positions of the set of visual elements from which the image is composed.

5. The system of claim 1, wherein the one or more processors, when granting or denying access to the network resource, are configured to:
    compare the input image and the image;
    calculate a similarity score based on comparing the input image and the image; and
    determine whether the similarity score satisfies a threshold.

6. The system of claim 1, wherein a plurality of visual elements, identified in the information transmitted to the client device, are determined based on the set of visual elements from which the image is composed.

7. The system of claim 1, wherein a plurality of visual elements, identified in the information transmitted to the client device, include one or more visual elements that are not components of the image.

8. The system of claim 7, further comprising identifying the one or more visual elements that are not components of the image based on the set of visual elements from which the image is composed and using a data structure that stores information that identifies associations between visual elements.

9. A method for multi-factor authentication, comprising:
    transmitting, by a server device and to a first device associated with a request to access a resource, an image, or a link to the image, wherein the image is composed of a set of visual elements that each have a particular visual attribute;
    transmitting, by the server device and to a second device, information to cause the second device to present an interface indicating instructions to recreate the image by inputting one or more visual elements to form an input image of an authentication symbol with reference to the image presented to the first device, the input image being formed via input of a set of one or more visual elements via the interface; and
    granting or denying access to the resource based on the image and information indicative of the input image.

10. The method of claim 9, wherein the information causes a plurality of visual elements to be presented via the interface of the second device and enables visual elements, of the plurality of visual elements, to be input to form the input image.

11. The method of claim 9, wherein the input image is formed via at least one of:
   selecting the set of one or more visual elements, presented via the interface, to form the input image, or
   drawing the set of one or more visual elements via the interface.

12. The method of claim 9, wherein the input image is formed via:
   separately dragging one or more first visual elements, and drawing one or more second visual elements.

13. The method of claim 9, further comprising:
   randomly selecting a first visual element to be included in the image; and
   identifying a second visual element to be included in the image based on the first visual element.

14. The method of claim 9, wherein granting or denying access to the resource comprises:
   comparing the input image and the image;
   calculating a similarity score based on comparing the input image and the image; and
   determining whether the similarity score satisfies a threshold.

15. The method of claim 9, wherein the input image is formed using an input mechanism that enables intersection or overlapping of at least two visual elements of the set of one or more visual elements.

16. A non-transitory computer-readable medium storing a set of instructions, the set of instructions comprising:
   one or more instructions that, when executed by one or more processors of a client device, cause the client device to:
      receive, from a server device, information that identifies an interface to be presented by the client device in association with a request to access a network resource;
      present, via the interface:
         an indication that includes instructions to recreate an image presented to a user device by inputting one or more visual elements to form, with reference to the image presented to the user device, an input image of an authentication symbol via input of a set of one or more visual elements, wherein the image is composed of a set of visual elements that each have a particular visual attribute; and
      receive, from the server device, a message indicating whether access to the network resource is granted or denied based on transmitting input symbol information indicative of the input image.

17. The non-transitory computer-readable medium of claim 16, wherein the input symbol information includes the input image.

18. The non-transitory computer-readable medium of claim 16, wherein the input symbol information includes at least one of:
   the input image,
   information that identifies the set of one or more visual elements used to form the input image, or
   position information that identifies respective positions of the set of one or more visual elements.

19. The non-transitory computer-readable medium of claim 16, wherein the input symbol information includes information that identifies a sequence in which the set of one or more visual elements were input to form the input image.

20. The non-transitory computer-readable medium of claim 16, wherein the input image is formed by drawing or by using a selecting mechanism.

* * * * *